(12) United States Patent
Vaughn et al.

(10) Patent No.: US 10,550,899 B2
(45) Date of Patent: Feb. 4, 2020

(54) TRANSMISSION FOR WHEELED MACHINE

(71) Applicant: Honda Motor Co., Ltd., Tokyo (JP)

(72) Inventors: Christopher W. Vaughn, Mebane, NC (US); Nathaniel Lenfert, Graham, NC (US)

(73) Assignee: Honda Motor Co., Tokyo (JP)

( * ) Notice: Subject to any disclaimer, the term of this patent is extended or adjusted under 35 U.S.C. 154(b) by 132 days.

(21) Appl. No.: 15/941,190

(22) Filed: Mar. 30, 2018

(65) Prior Publication Data

US 2019/0301543 A1    Oct. 3, 2019

(51) Int. Cl.
| | | |
|---|---|---|
| *F16D 41/06* | (2006.01) | |
| *F16D 41/12* | (2006.01) | |
| *A01D 34/69* | (2006.01) | |
| *A01D 34/68* | (2006.01) | |
| *A01D 101/00* | (2006.01) | |
| *F16D 41/069* | (2006.01) | |

(52) U.S. Cl.
CPC ............. *F16D 41/12* (2013.01); *A01D 34/69* (2013.01); *F16D 41/06* (2013.01); *A01D 2034/6837* (2013.01); *A01D 2034/6843* (2013.01); *A01D 2101/00* (2013.01); *F16D 41/069* (2013.01); *F16D 2041/0603* (2013.01); *F16D 2041/0608* (2013.01)

(58) Field of Classification Search
CPC ........ F16D 41/06; F16D 41/069; F16D 41/12; F16D 41/16; F16D 2041/0603; F16D 2041/0608
See application file for complete search history.

(56) References Cited

U.S. PATENT DOCUMENTS

| | | | |
|---|---|---|---|
| 2,597,735 | A | 5/1952 | Jepson |
| 2,800,987 | A | 7/1957 | Potts |
| 3,720,294 | A | 3/1973 | Plamper |
| 3,732,673 | A | 5/1973 | Winn, Jr. |
| 4,117,651 | A | 10/1978 | Martin, Jr. |
| 4,214,641 | A | 7/1980 | Hauser |
| 4,909,365 | A | 3/1990 | Tillotson et al. |

(Continued)

OTHER PUBLICATIONS

International Search Report and Written Opinion of PCT/US2018/065618 dated Feb. 28, 2019, 12 pages.

*Primary Examiner* — David R Morris
(74) *Attorney, Agent, or Firm* — Mark E. Duell; Rankin, Hill & Clark LLP

(57) ABSTRACT

A transmission for a manually operated wheeled machine includes an output shaft having a close-ended axial channel. A drive gear mounted on the output shaft includes an engaging groove. A ratchet is received in the channel and is in engagement with the engaging groove. A holder mounted on the output shaft includes a relief that receives the ratchet. A friction member applies radial friction to the holder to temporarily prevent rotation of the holder with the output shaft in a drive condition of the machine moving the ratchet into engagement with the engaging groove, and in the drive condition the drive gear and holder rotate with the output shaft. In a freewheeling condition of the machine the output shaft is stationary, and an overdrive of the drive gear disengages the ratchet from the engaging groove allowing for free rotation of the drive gear about the stationary output shaft.

20 Claims, 12 Drawing Sheets

(56) References Cited

U.S. PATENT DOCUMENTS

| | | | | |
|---|---|---|---|---|
| 4,926,714 | A | * | 5/1990 | Bailey .................... B62M 11/06 |
| | | | | 192/217.4 |
| 4,995,227 | A | | 2/1991 | Foster |
| 5,303,534 | A | | 4/1994 | Gray |
| 6,155,650 | A | * | 12/2000 | Barger ................. F16D 65/847 |
| | | | | 188/218 A |
| 6,354,414 | B1 | | 3/2002 | Sueshige et al. |
| 6,475,109 | B2 | | 11/2002 | Blanchard |
| 6,575,280 | B2 | | 6/2003 | Ballew et al. |
| 7,073,648 | B2 | | 7/2006 | Ishikawa et al. |
| 9,856,930 | B2 | * | 1/2018 | Heath .................. F16D 41/067 |
| 2001/0020565 | A1 | * | 9/2001 | Blanchard ................ F16H 7/14 |
| | | | | 192/3.54 |
| 2002/0185353 | A1 | * | 12/2002 | Ballew .................... F16D 41/12 |
| | | | | 192/45.1 |
| 2005/0087418 | A1 | * | 4/2005 | Ishikawa ................ F16D 41/12 |
| | | | | 192/46 |
| 2017/0268584 | A1 | | 9/2017 | Heath et al. |

\* cited by examiner

TRANSMISSION FOR WHEELED MACHINE

BACKGROUND

Currently, the drive system of a wheeled machine, for example a lawnmower, includes a transmission and wheels driven by a pinion on the output shaft of the transmission. In order to minimize friction when the user pushes the lawnmower forward, simple ratchet mechanisms have been used inside the pinion mounted on the transmission output shaft. This allows for one-way driving of the wheels by the transmission and low friction in the forward direction. However, if the user wants to pull the lawnmower backwards, the ratchets do not disengage from the transmission output shaft. This causes high roll-back friction that the user must overcome to move the lawnmower backwards. In many cases, the pullback load is high enough to cause customers to complain about high load.

It is known to use a combination of mechanisms to allow freewheeling when the transmission is not driving the system, and many of these designs are contained within the transmission itself. The internal-to-transmission style solves the freewheeling problem by disengaging the output shafts from the input shaft of the transmission, thus reducing the overall friction the user must overcome to move the lawnmower. However, in this construction, the output shafts of the transmission are independent from each other. This separation necessitates additional support for the shafts in the transmission housing. The shafts must be supported because of the joint they have between the left and right output shafts. It is also known to use a freewheeling ratchet system built into the wheel pinion mounted on the transmission output shaft. However, this design is susceptible to dust intrusion because of tight tolerances of the mating parts.

BRIEF DESCRIPTION

According to one aspect, a transmission for a manually operated wheeled machine having a drive condition and a freewheeling condition is provided. The transmission comprises an output shaft having a close-ended channel formed in an end portion thereof. The channel extends in an axially longitudinal direction of the output shaft and is axially spaced from an end face of the output shaft. A drive gear is rotatably mounted on the end portion of the output shaft. The drive gear includes an engaging groove formed in an inner peripheral surface of the drive gear. The drive gear is meshingly engaged with a driven gear carried within a drive wheel of the wheeled machine. A ratchet has a key portion and a leg portion extending from the key portion in a radial direction of the output shaft. The key portion is received in the channel and is in selective engagement with the engaging groove. A holder is rotatably mounted on the end portion of the output shaft. The holder includes an end face confronting the drive gear. A relief formed in the end face receives the leg portion of the ratchet. A friction member is secured to the holder and adapted to apply radial friction to the holder to temporarily prevent rotation of the holder with the output shaft in the drive condition of the wheeled machine. As a result, the key portion of the ratchet is moved into engagement with the engaging groove of the drive gear, and in the drive condition the output shaft rotates in a first rotational direction together with the drive gear and the holder. In the freewheeling condition the output shaft is stationary, and an overdrive of the drive gear in the first rotational direction results in disengagement of the key portion of the ratchet with the engaging groove allowing for free rotation of the drive gear about the stationary output shaft.

According to another aspect, a manually operated wheeled machine has a drive condition and a freewheeling condition. The wheeled machine comprises a motor and an output shaft operably coupled to the motor. The output shaft has a close-ended channel formed in an end portion thereof. The channel extends in an axially longitudinal direction of the output shaft and is axially spaced from an end face of the output shaft. A drive wheel is connected to the end portion of the output shaft. The drive wheel includes an inside wheel cover having an opening for the output shaft. A transmission is housed within the drive wheel. The transmission includes a drive gear rotatably mounted on the end portion of the output shaft. The drive gear includes an engaging groove formed in an inner peripheral surface of the drive gear. A ratchet has a key portion and a leg portion. The key portion is received in the channel. The ratchet is in selective engagement with the engaging groove of the drive gear. A holder is rotatably mounted on the end portion of the output shaft immediately adjacent the drive gear. The holder includes an end face having a relief formed therein which receives the leg portion of the ratchet. A driven gear carried within the drive wheel is meshingly engaged with the drive gear. To prevent dust intrusion into the channel the drive gear and the holder are arranged on the end portion of the output shaft to cover the channel, and the inside wheel cover includes a shroud covering each of the drive gear and the holder.

According to another aspect, a transmission for a manually operated wheeled machine having a drive condition and a freewheeling condition is provided. The transmission comprises an output shaft having a close-ended channel formed in an end portion thereof. The channel extends in an axially longitudinal direction of the output shaft and is axially spaced from an end face of the output shaft. A drive gear is rotatably mounted on the end portion of the output shaft. The drive gear includes an engaging groove formed in an inner peripheral surface of the drive gear. A ratchet received in the channel is in selective engagement with the engaging groove. A holder is rotatably mounted on the end portion of the output shaft. The holder includes an end face confronting the drive gear. A relief is formed in the end face receives the ratchet. A friction member at least partially wrapped about an outer peripheral surface of the holder is adapted to apply radial friction to the holder to temporarily prevent rotation of the holder with the output shaft in the drive condition of the wheeled machine. A driven gear meshingly engaged with the drive gear is carried within a drive wheel of the wheeled machine.

DETAILED DESCRIPTION

Figure 1:
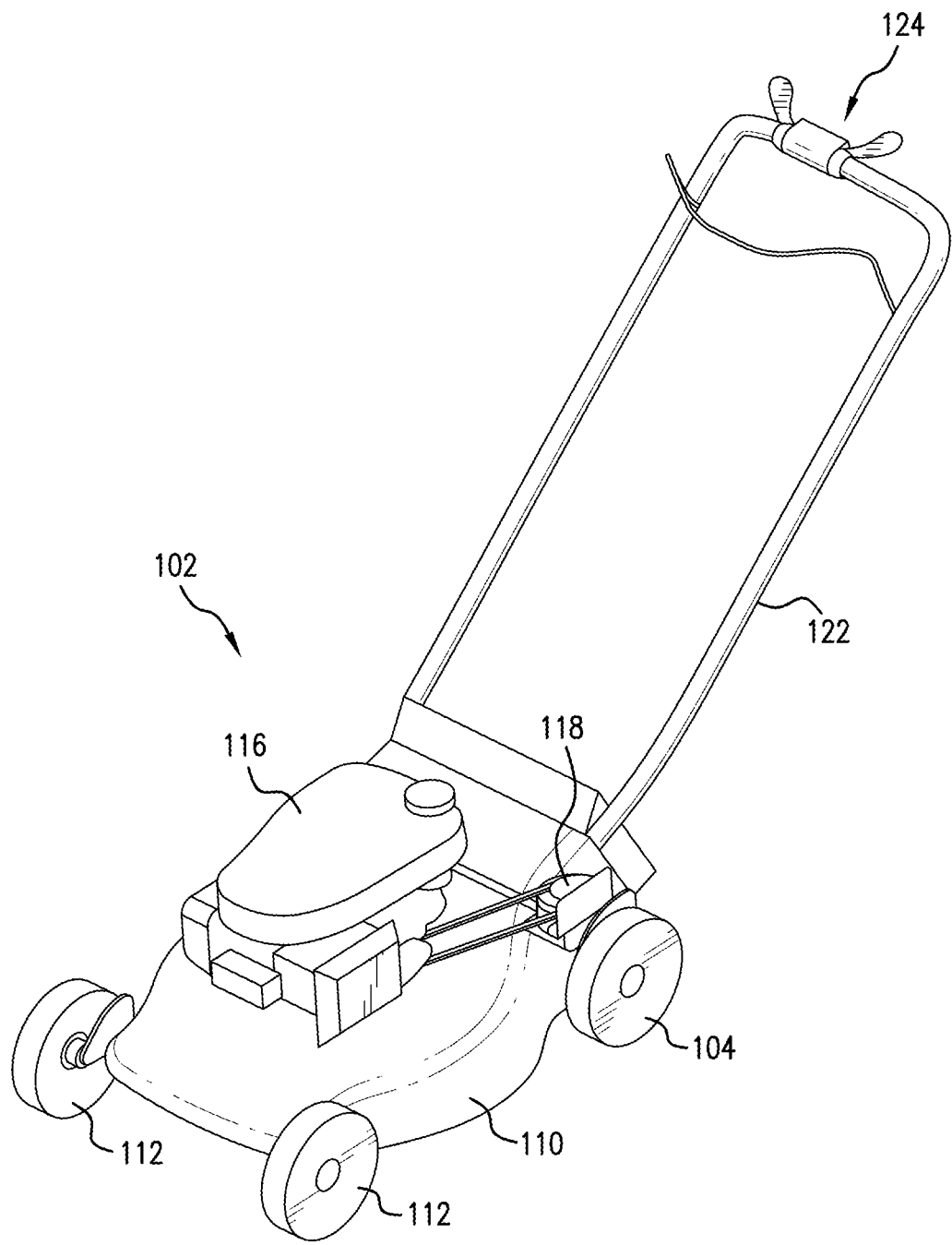
FIG. 1 is a schematic perspective view of a manually operated wheeled machine in the form of a walk-behind self-propelled lawn mower.

It should, of course, be understood that the description and drawings herein are merely illustrative and that various modifications and changes can be made in the structures disclosed without departing from the present disclosure. Referring now to the drawings, wherein like numerals refer to like parts throughout the several views, the present disclosure relates to a transmission 100 for a manually operated wheeled machine 102 having a drive condition and a freewheeling condition. As used herein, the drive condition refers to a condition of the wheeled machine where the transmission 100 is in an engaged state and torque is transmitted to at least one drive wheel 104 of the wheeled machine 102, and the freewheeling condition refers to a condition of the wheeled machine where the transmission 100 is in a disengaged state and at least one drive wheel 104 can freely rotate in both forward and rearward directions. FIG. 1 shows the application of the transmission 100 to a self-propelled, walk-behind lawn mower (i.e., the wheeled machine 102) with which an operator mows, walking behind the lawn mower. However, it should be noted that the transmission 100 could be used with a wide variety of manually operated wheeled power implements, including various types of lawn mowers, power carriers (i.e., wheelbarrows), snow throwers, and the like; the lawn mower 102 merely exemplifies the present disclosure.

Figure 2:
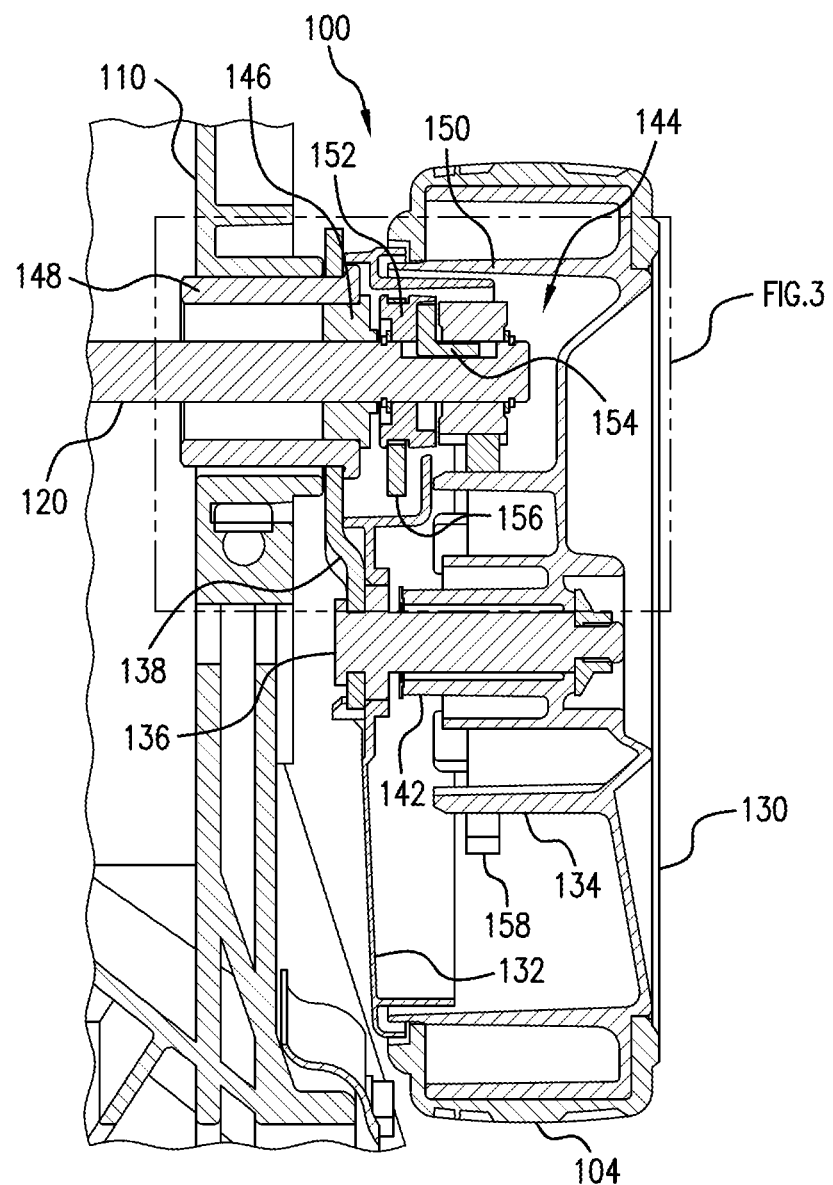
FIG. 2 is a partial cross-sectional view of a drive wheel of the lawn mower.
Figure 3:
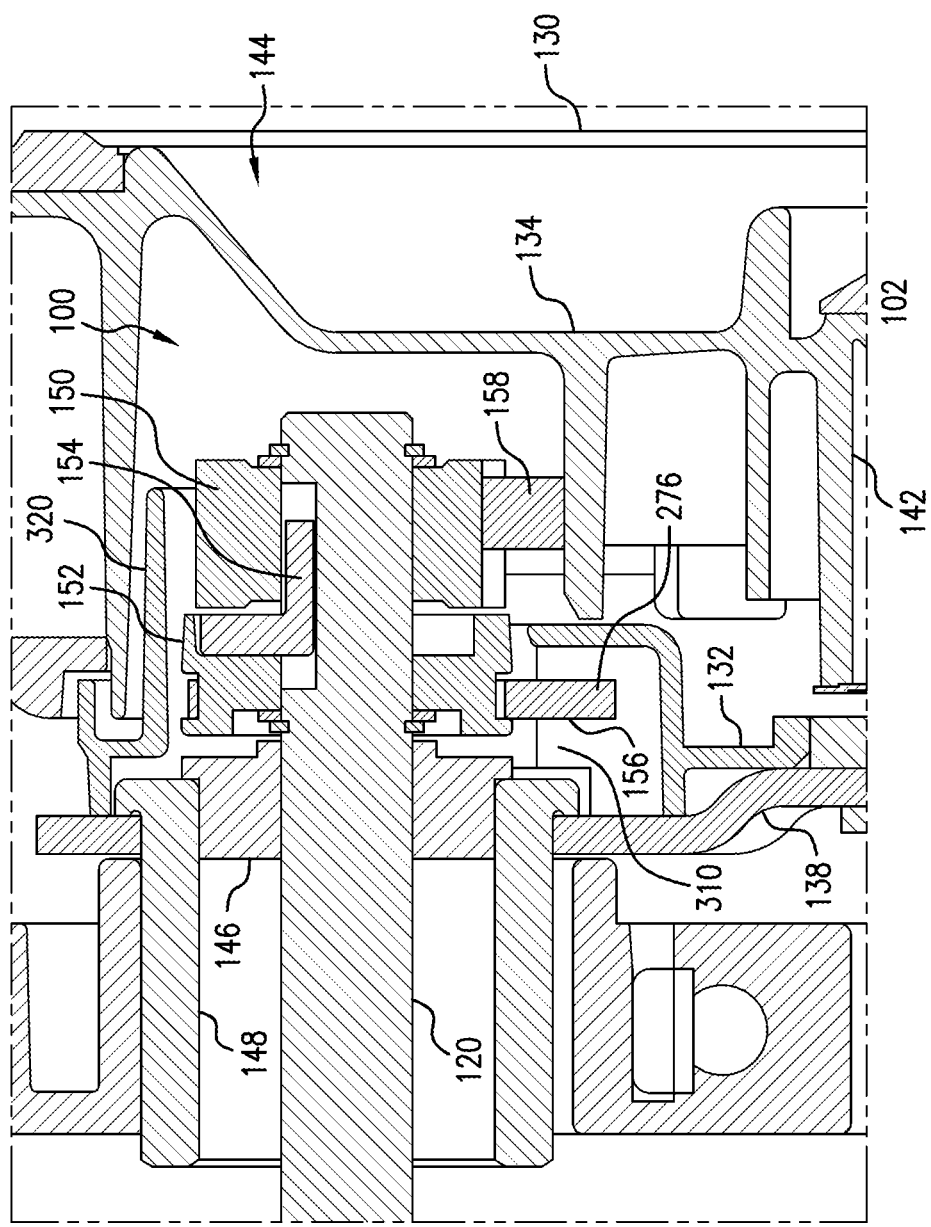
FIG. 3 is an enlarged view of FIG. 2.

As schematically illustrated in FIG. 1, the lawn mower 102 has a blade housing 110 carried by rear drive wheels 104 (the right rear drive wheel is not shown because FIG. 1 is a view of the lawn mower 102 taken from one side) and front wheels 112. Mounted atop the housing 110 is a "prime mover" 116, which is a gasoline engine in the embodiment depicted in FIG. 1, but could alternatively be an electric motor. As is well known, a cutting blade (not shown) is connected to an output shaft (not shown) of the engine 116, a drive unit 118 is operably coupled to the output shaft, and the drive wheels 104 are operably connected to the drive unit 118 via an output shaft or drive shaft 120 of the drive unit 118 (FIGS. 2 and 3). An operating handle 122 extends obliquely from the rear of the housing 110 in a rearward and upward direction and includes operator controls 124, which are configured to selectively engage and disengage the drive unit 118. With reference to FIGS. 2 and 3, the drive wheel 104 includes an outside cover 130 and an inside cover 132, each connected to a wheel hub 134. An axle 136 of the drive wheel 104 is secured to a support 138 of the housing 110 and extends through the inside cover 132. The axle 136 is fitted in a tubular part 142 of the hub 134. The inside cover 132 together with the outside cover 130 defines an enclosure 144, and the exemplary transmission 100 is received in the enclosure. The drive shaft 120 is received in a bearing 146 mounted in a bearing housing 148 that is secured to the housing 110. The support 138 is connected to the bearing housing 148.

Figure 4:
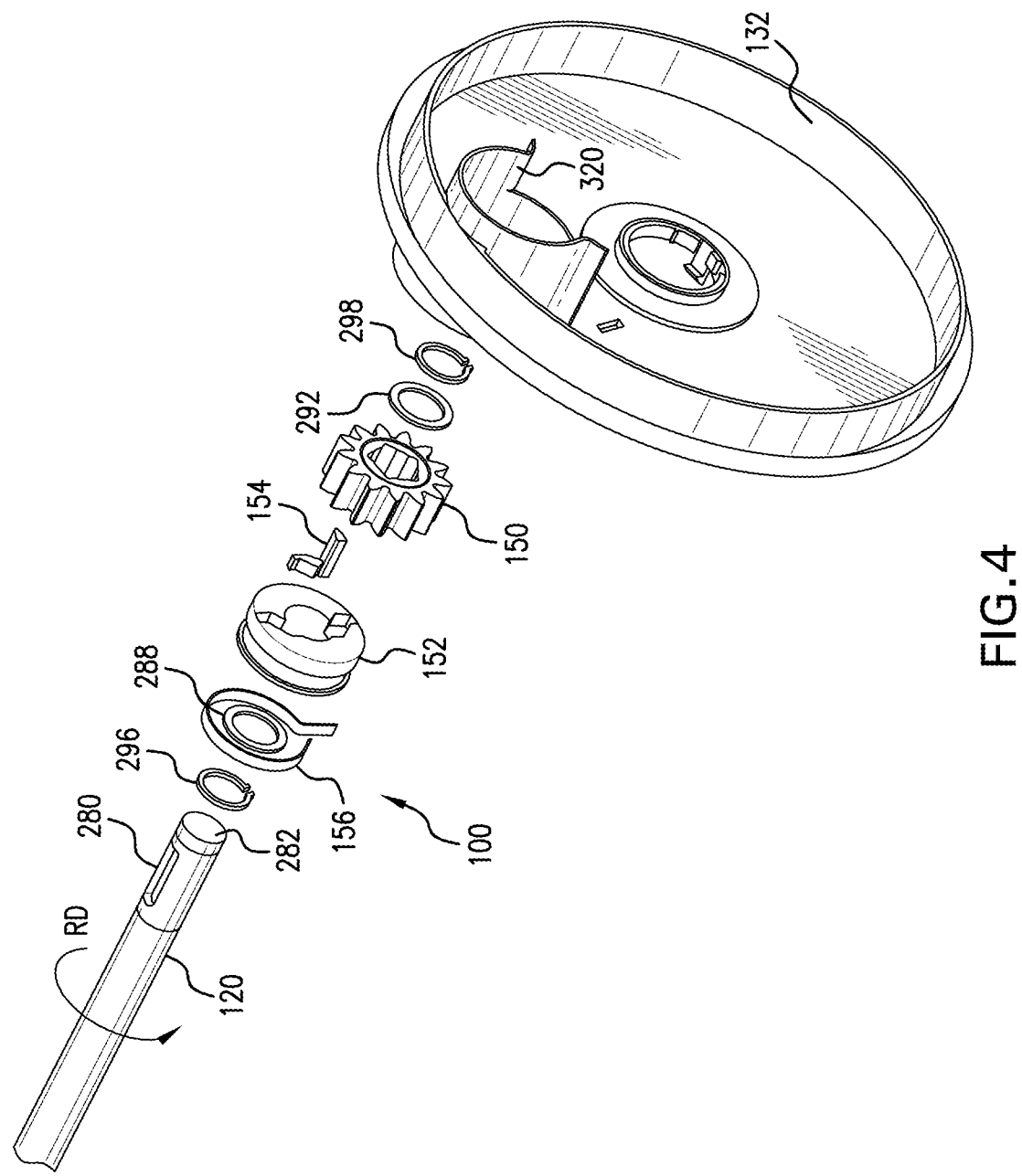
FIG. 4 is an exploded perspective view of an exemplary transmission housed in the drive wheel.

According to the present disclosure, the transmission 100 includes a first gear or drive gear 150 rotatably mounted on an end portion of the drive shaft 120, a holder 152 rotatably mounted on the end portion of the drive shaft 120 immediately adjacent the drive gear 150, a ratchet 154 in selective engagement with the drive gear 150 and the holder 152, and a friction member 156 secured to the holder 152 (see FIG. 4). A second gear or driven gear 158 is fixedly mounted on the hub 134 coaxially with a rotational axis of the drive wheel 104 and is meshingly engaged with the drive gear 150. The transmission 100 acts to transmit power from the drive shaft 120, through the driven gear 158, to the drive wheel 104. The transmission 100 is configured to allow the drive wheel 104 to bidirectionally freewheel when the drive shaft 120 is stationary (i.e., the drive shaft is not rotated by the drive unit 118).

Figure 5:
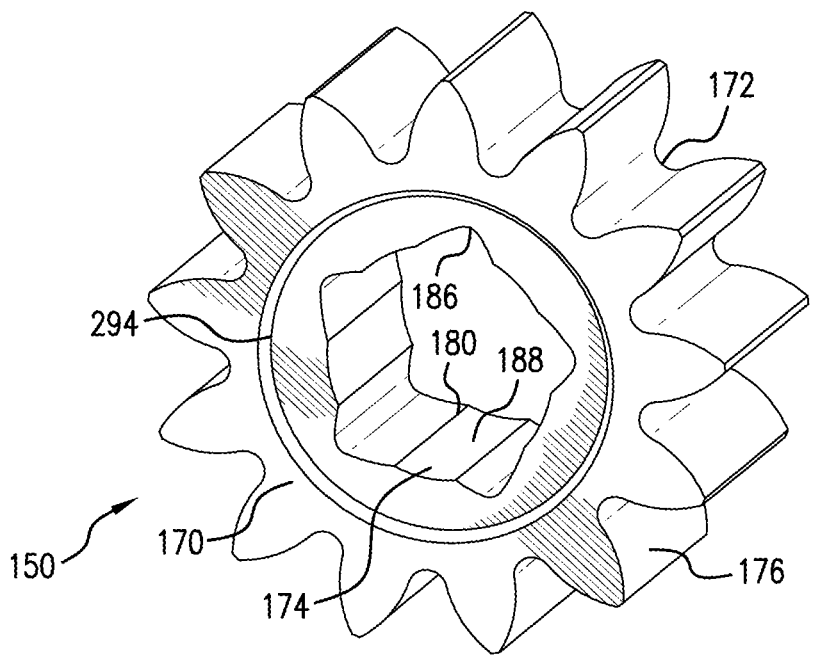
FIG. 5 is a perspective view of a drive gear of the transmission.
Figure 6:
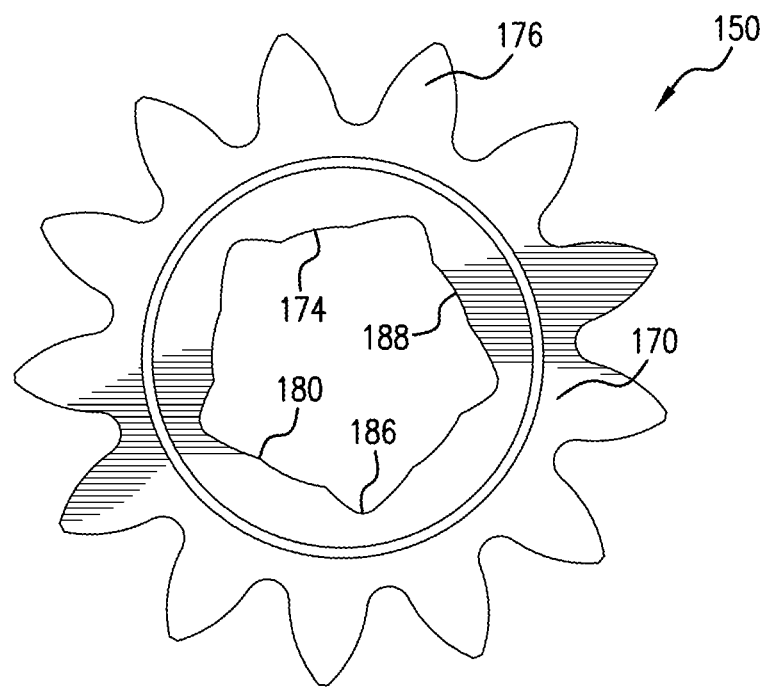
FIG. 6 is a front view of the drive gear of FIG. 5.

FIGS. 5 and 6 depict the exemplary drive gear 150. The drive gear 150 includes a first confronting surface 170, a second confronting surface 172, a through hole 174 extending between the first and second confronting surfaces 170, 172 sized to receive the end portion of the drive shaft 120, and teeth 176 formed on an outer circumferential surface of the drive gear 150. The through hole 174 is defined by an inner peripheral surface 180 and at least one engaging groove 186 is formed in the inner surface 180 for engagement with the ratchet 154. In the depicted aspect of the drive gear 150, the inner surface 180 is polygonal shaped with vertices of the polygonal shaped inner surface 180 forming the engaging grooves 186 of the drive gear 150. By way of example, as shown the inner surface 180 is pentagon shaped; although, this is not required. Further, edge sections 188 of the inner surface 180 can be concaved and curved for maintaining positional relationship of the ratchet 154 within a selected engaging groove 186.

Figure 7:
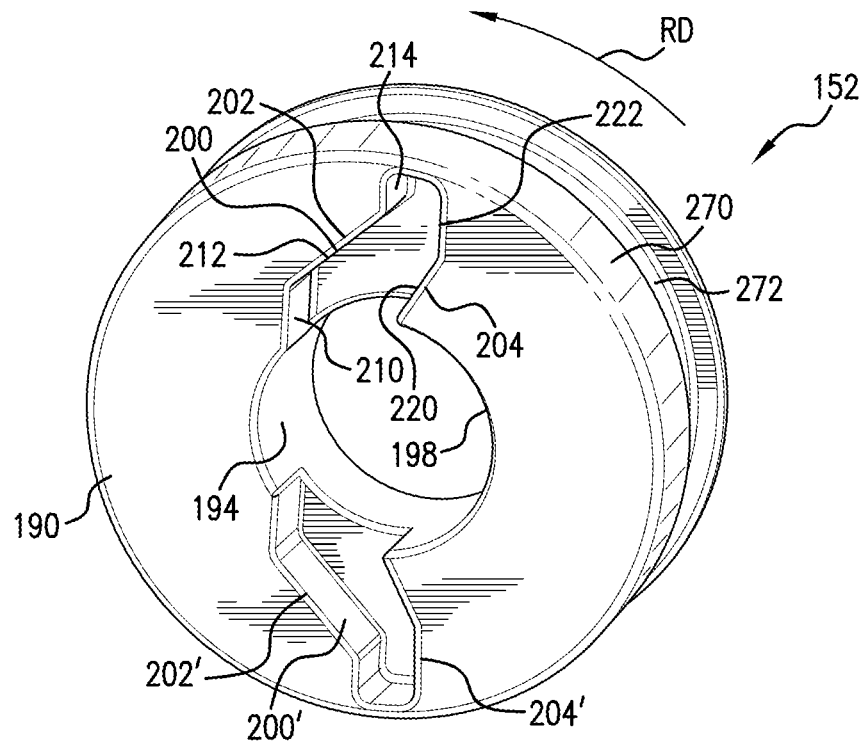
FIGS. 7 and 8 are perspective views of a holder of the transmission.
Figure 8:
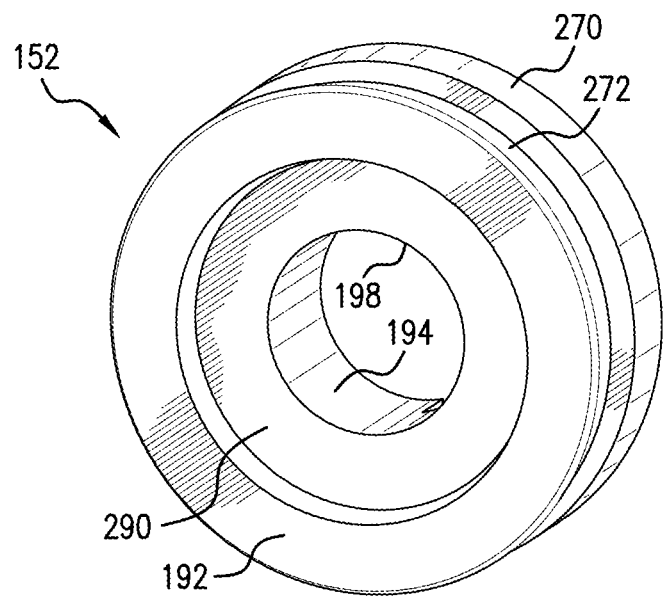

FIGS. 7 and 8 depict the exemplary holder 152. The holder 152, which can be ring-shaped, includes a first confronting surface or first end face 190, a second confronting surface or second end face 192, and an inner surface 194 defining a through hole 198. The first end face 190 has at least one relief 200 formed therein which receives the ratchet 154. As depicted, the first end face 190 is provided with diametrically spaced reliefs 200, 200' which allows for the use of a common holder for each of the transmissions 100 of the left and right drive wheels 104. The relief 200 of the holder 152 (which is for use with the transmission 100 housed in the left drive wheel 104) is defined by a forward surface 202 and a rear surface 204 relative to a first rotational direction RD of the drive shaft 120 (see FIG. 4) in the drive condition of the lawn mower 102. The forward surface 202 includes a first section 210 contiguous with the inner surface 194, a second section 212 extending from the first section, and a third section 214 extending from the section. Each of the first and third sections 210, 214 can project substantially radially relative to an axially longitudinal direction of the drive shaft 120 with the first section 210 circumferentially spaced from the third section 214 in the first rotational direction. The second section 212 extends angularly between the first and third sections 210, 214. The rear surface 204 includes a first section 220 contiguous with the inner surface 194 and a second section 222 extending from the first section. The first section 220 can be canted rearward relative to the first rotational direction RD and the second surface can extend substantially radially relative to the longitudinal direction of the drive shaft 120. The relief 200' of the holder 152 (which is for use with the transmission 100 housed in the right drive wheel 104) is similar shaped with the forward surface 202' and the rear surface 204'.

Figures 9, 10:
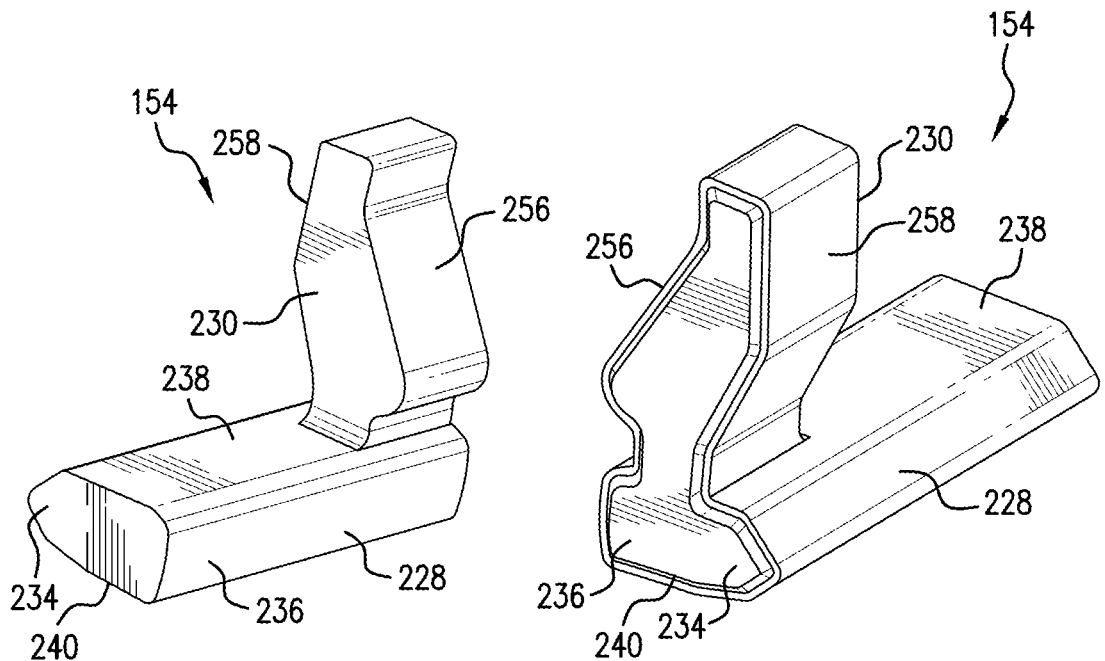
FIGS. 9 and 10 are perspective views of a ratchet of the transmission.
Figure 11:
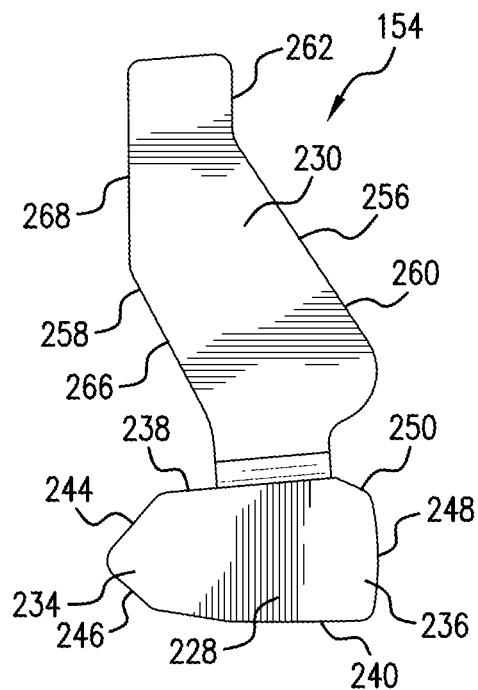
FIG. 11 is a front view of the ratchet of FIG. 10.

FIGS. 9-11 depict the exemplary ratchet 154 of the transmission 100. The ratchet 154 has a key portion 228 and a leg portion 230 extending from the key portion in a radial direction of the drive shaft 120. In the depicted aspect, the key portion 228 of the ratchet 154 is generally wedge-shaped and includes a first end 234, a second end 236 opposite the first end, a first side 238, and a second side 240 opposite the first side. The first end 234 can have first inclined surfaces 244, 246 which extend to the respective first and second sides 238, 240. The second end 236 can include a curved surface 248 and a second surface 250. As depicted, the second surface 250 extends to the first side 238 and is inclined toward the first end 234. According to one aspect of the ratchet 154, the leg portion 230 includes a forward surface 256 and a rear surface 258 relative to the first rotational direction RD of the drive shaft 120. The forward surface 256 can include a first section 260 and a second section 262 canted relative to the first section. The first and second sections 260, 262 substantially conform to the second and third sections 212, 214 of the forward surface 202 of the holder relief 200. The rear surface 258 can include a first section 266 and a second section 268 canted relative to the first section. The first and second sections 266, 268 substantially conform to the first and second sections 220, 222 of the rear surface 204 of the holder relief 200.

The transmission 100 further includes the friction member 156 which is configured to be at least partially wrapped about an outer peripheral surface 270 of the holder 152. In the depicted embodiment of FIG. 4, the friction member 156 can be constituted by a spring member. To accommodate the spring member, the outer peripheral surface 270 of the holder 152 includes a circumferential recess 272 (see FIG. 7) sized to receive the spring member. As will be described below, a free end portion 276 of the spring member is secured to the inside wheel cover 132 of the drive wheel 104.

Figure 12:
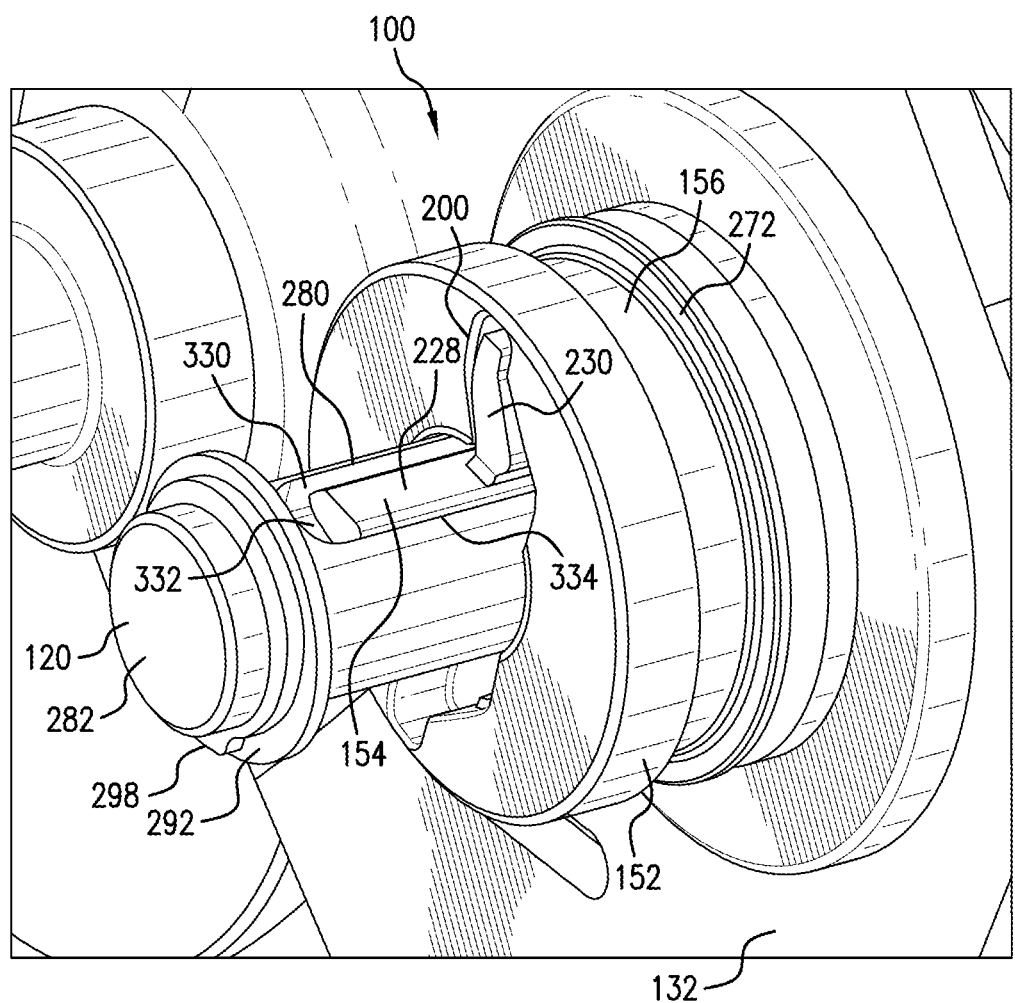
FIGS. 12 and 13 are perspective views depicting partial assembly of the transmission within the drive wheel of the lawn mower.
Figure 13:
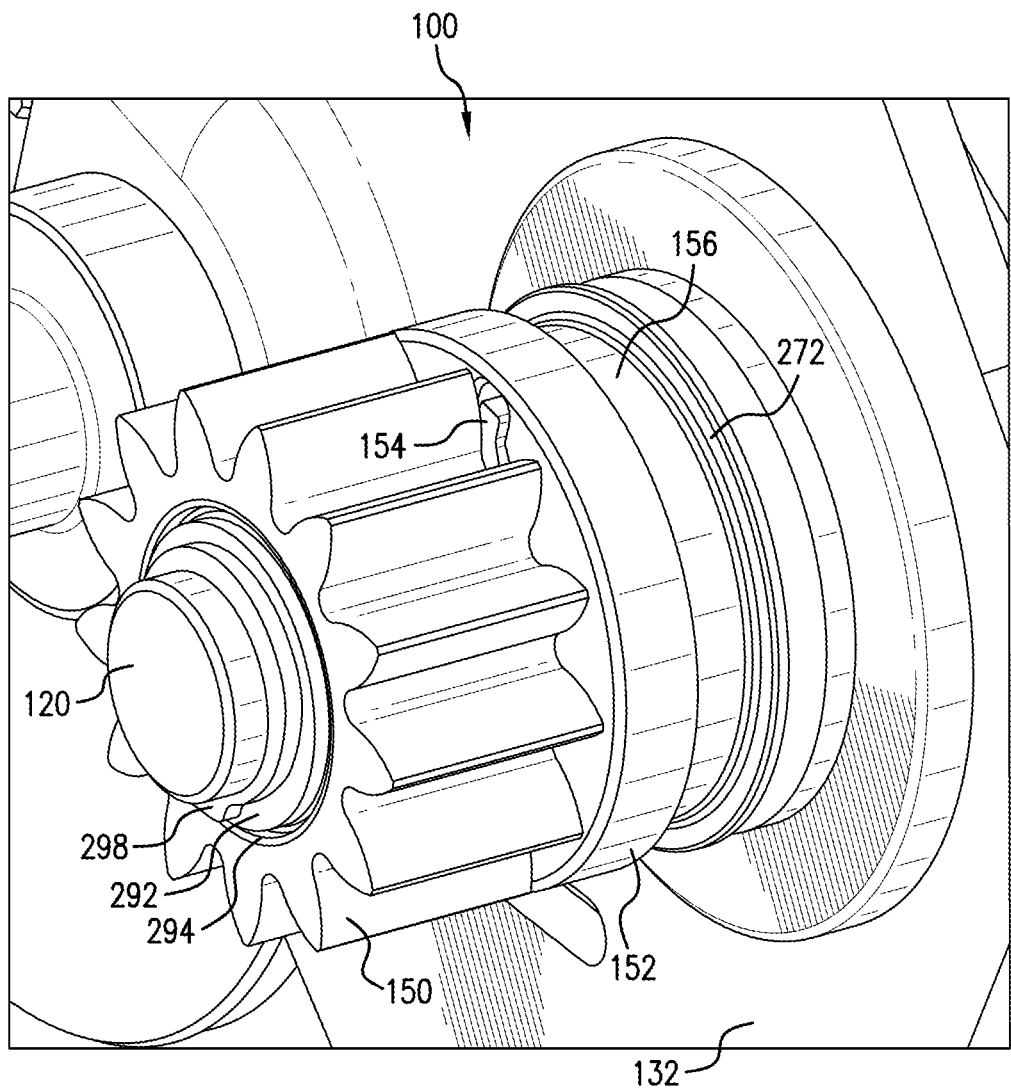
Figure 14:
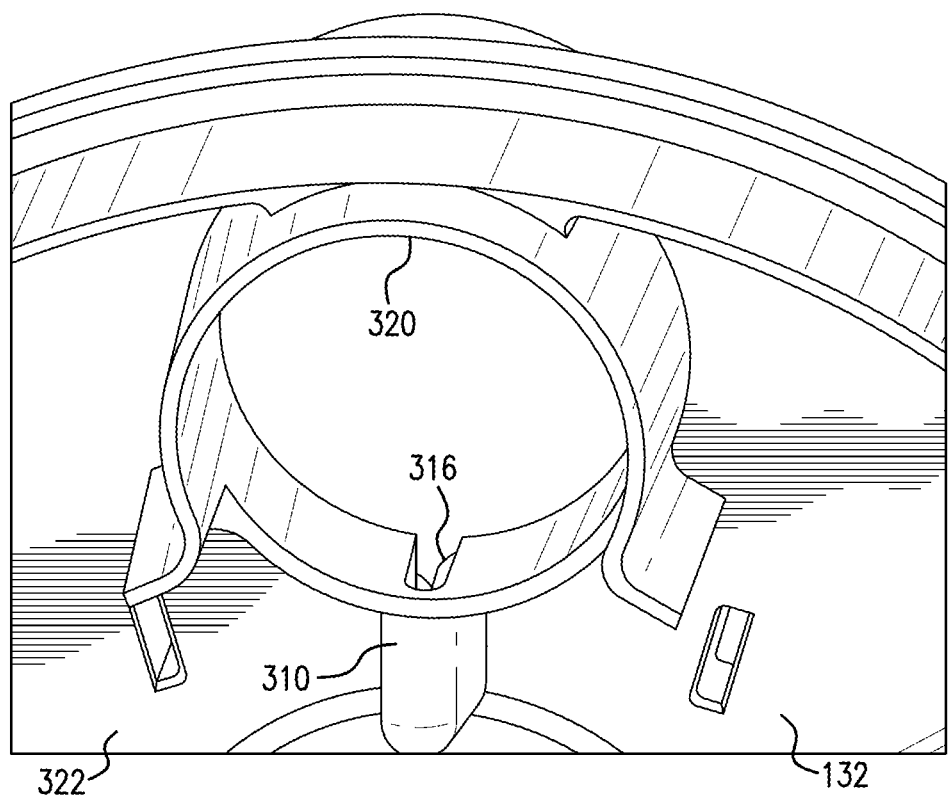
FIGS. 14 and 15 are partial views of an inside cover of a drive wheel.
Figure 15:
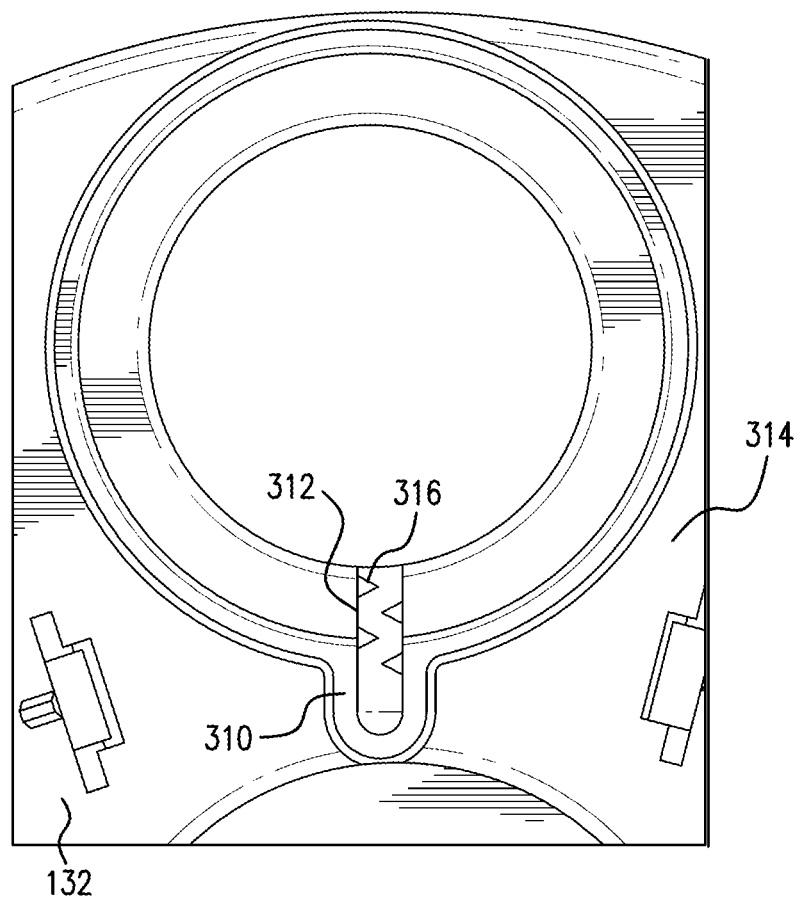

FIGS. 12 and 13 depict assembly of the transmission 100 on the drive shaft 120. The holder 152 is positioned onto the drive shaft with the friction member 156 received in the circumferential recess 272 of the holder 152. The key portion 228 of the ratchet 154 is received in a close-ended channel 280 formed in the end portion of the drive shaft 120. The channel 280 extends in the axially longitudinal direction of the drive shaft 120 and is axially spaced from an end face 282 of the drive shaft. According to one aspect, the channel 280 is substantially rectangular in cross-section taken perpendicular to the longitudinal direction of the drive shaft 120. The leg portion 230 of the ratchet 154 is received in the relief 200 formed in the holder 152. The drive gear 150 is then positioned onto the drive shaft 120. With additional reference to FIG. 3, a washer 288 is received in a recessed portion 290 formed in the second end face 192 of the holder 152, and a washer 292 is received in a recessed portion 294 formed in the second confronting surface 172 of the drive gear 150. Snap rings 296, 298 fitted into circumferential grooves on the drive shaft 120 secure the transmission 100 to the drive shaft 120. Further, with reference to FIGS. 3, 14 and 15, to secure the free end portion 276 of the friction member 156 to the inside wheel cover 132, the inside cover 132 includes a pocket 310 having an opening 312 on an outside surface 314 of the inside cover 132. The pocket 310 receives the free end portion 276, and teeth 316 projecting into the pocket 310 engage the free end portion 276 thereby securing the friction member 156 to the inside cover 132.

It should be appreciated that the closed-ended channel 280 for the ratchet 154 is advantageous over prior art designs where a channel for a ratchet has an open end formed on an end face of a drive shaft. With the channel 280 axially spaced from the end face 282, dust intrusion into the channel 280 which can impact operational movement of the ratchet 154 can be prevented. To further prevent dust intrusion into the channel 280, the drive gear 150 and the holder 152 are arranged on the end portion of the drive shaft 120 to cover the channel 280 (see also FIG. 3). In addition, the inside wheel cover 132 includes a shroud 320 extending from an inner surface 322 of the inside cover 132. The shroud 320, which can be arcuate shaped, covers each of the drive gear 150 and the holder 152.

Figure 16:
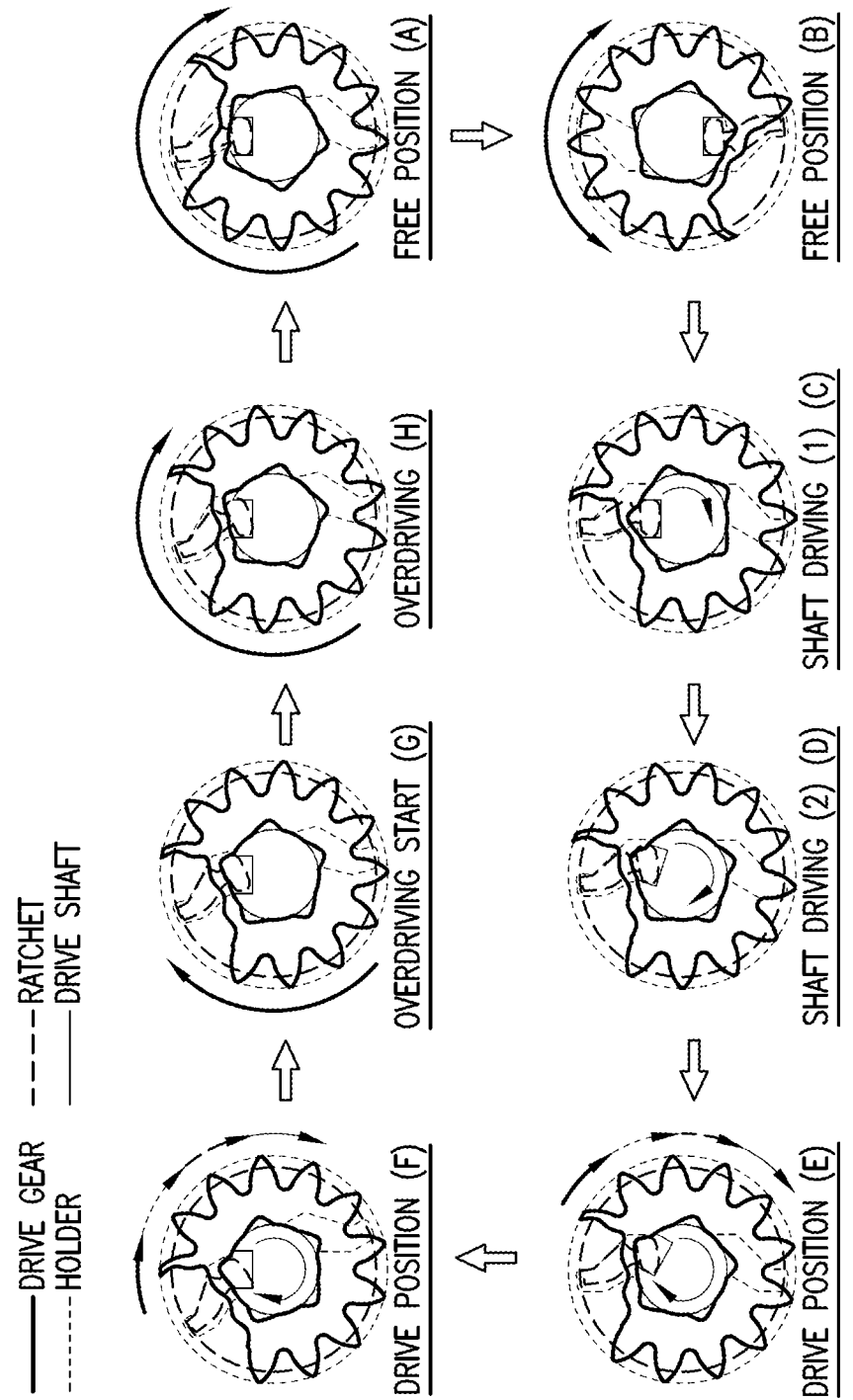
FIG. 16(A)-16(H) depict various operational states of the exemplary transmission.

Now, the operation of the exemplary transmission 100 will be described with reference to the various operational states of the transmission depicted in FIGS. 16(A)-16(H), with the drive shaft 120, drive gear 150 (partially cut away), holder 152 and ratchet 154 depicted by differing types of lines. It should also be noted that identified features of the components of the transmission 100 in the description to follow refer back to FIGS. 1-15 of the present disclosure. First, in freewheeling condition of the lawn mower 102 (i.e., the free position state—FIGS. 16(A) and 16(B)), the transmission 100 is not transmitting a driving force from the drive unit 118 to the driven gear 158. Specifically, the key portion 228 of the ratchet 154 is not in engagement with any engaging groove 186 of the drive gear 150. FIG. 16(B) shows the leg portion 230 of the ratchet 154 in contact with the rear surface 204 of the relief 200 of the holder 152.

When the engine 116 of the lawn mower 102 is started and the drive shaft 120 starts rotating in a direction shown by the arrow in FIG. 16(C) (i.e., the shaft driving (1) state), the friction member 156 secured to the holder 152 applies a radial friction to the holder 152 to temporarily prevent rotation of the holder with the drive shaft 120 in the drive condition of the lawn mower 102. This frictional hold of the holder 152 cause the ratchet 154 rotating with the drive shaft 120 to engage the forward surface 202 of the relief 200 of the holder 152. Specifically, the second section 262 of the forward surface 256 of the ratchet leg portion 230 contacts the third section 214 of the relief forward surface 202. This contact at least partially rotates the ratchet 154 in a direction opposite the rotational direction of the drive shaft 120. In FIG. 16(D) (the shaft driving (2) state), the ratchet key portion 228 abuts the inner peripheral surface 180 of the drive gear 150.

Next, in the drive condition of the lawn mower 102 (i.e., the drive position states—FIGS. 16(E) and 16(F)), the leg portion 230 of the ratchet 154 is pivoted on the forward surface 202 of the relief 200 such that the first section 260 of the leg portion forward surface 256 is now in contact with the second section 212 of the relief forward surface 202, and the leg portion 230 is spaced from the relief rear surface 204. In the drive condition the first inclined surfaces 244, 246 of the first end 234 of the ratchet key portion 228 engage a first side 330 and a base 332 of the channel 280 (see FIG. 12), and the second end 236 of the ratchet key portion 228 engages the engaging groove 186 of the drive gear 150. This engagement of the key portion 228 with the engaging groove 186 of the drive gear 150 causes the drive gear 150 and the holder 152 to rotate together with the drive shaft 120.

In the overdriving start state (FIG. 16G) of the transmission 100 where the drive shaft 120 is stationary, an overdrive of the first gear 150 in the rotational direction (which naturally takes place because of the inertia of the wheeled machine 102 which tends to give rise to supplemental advance of the wheeled machine) results in a pivoting of the ratchet 154 in the rotational direction. As a result, in the overdriving state (FIG. 16H) of the transmission 100, the ratchet leg portion 230 pivots on the relief forward surface 202, and the curved surface 248 of the second end 236 of the ratchet key portion 228 allows the second end 236 to slide along a second side 334 of the channel (FIG. 12) as the lawn mower 102 transitions from the drive condition to the freewheeling condition. Again, in the freewheeling condition the key portion 228 of the ratchet 154 is disengaged from the engaging groove 186 of the drive gear 150 allowing for free rotation of the drive gear about the stationary drive shaft 120. Further, it should be appreciated that the second end 236 of the key portion 228 includes the second inclined surface 250, where in the freewheeling condition the second inclined surface 250 engages the inner peripheral surface 180 of the drive gear 150 (FIG. 16(B)) to prevent unwanted movement of the ratchet 154 in the freewheeling condition which can cause reengagement of the drive gear 150.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A transmission for a manually operated wheeled machine having a drive condition and a freewheeling condition, the transmission comprising:
   an output shaft having a close-ended channel formed in an end portion thereof, the channel extends in an axially longitudinal direction of the output shaft and is axially spaced from an end face of the output shaft;
   a drive gear rotatably mounted on the end portion of the output shaft, the drive gear includes an engaging groove formed in an inner peripheral surface of the drive gear, the drive gear is meshingly engaged with a driven gear carried within a drive wheel of the wheeled machine;
   a ratchet having a key portion and a leg portion extending from the key portion in a radial direction of the output shaft, the key portion is received in the channel and is in selective engagement with the engaging groove;
   a holder rotatably mounted on the end portion of the output shaft, the holder includes an end face confronting the drive gear, a relief formed in the end face receives the leg portion of the ratchet; and
   a friction member secured to the holder and adapted to apply radial friction to the holder to temporarily prevent rotation of the holder with the output shaft in the drive condition of the wheeled machine, and, as a result, the key portion of the ratchet is moved into engagement with the engaging groove of the drive gear, where in the drive condition the output shaft rotates in a first rotational direction together with the drive gear and the holder,
   where in the freewheeling condition the output shaft is stationary, an overdrive of the drive gear in the first rotational direction results in disengagement of the key portion of the ratchet with the engaging groove allowing for free rotation of the drive gear about the stationary output shaft.

2. The transmission of claim 1, wherein to prevent dust intrusion into the channel the drive gear and the holder are arranged on the end portion of the output shaft to cover the channel in both the drive condition and the freewheeling condition of the wheeled machine.

3. The transmission of claim 2, wherein an inside wheel cover of the drive wheel includes a shroud covering each of the drive gear and the holder.

4. The transmission of claim 1, wherein the friction member is a spring member at least partially wrapped about an outer peripheral surface of the holder.

5. The transmission of claim 4, wherein a free end portion of the spring member is secured to an inside wheel cover of the drive wheel.

6. The transmission of claim 4, wherein the outer peripheral surface of the holder includes a circumferential recess sized to receive the spring member.

7. The transmission of claim 1, wherein the channel is rectangular in cross-section taken perpendicular to the axially longitudinal direction of the output shaft, the channel defined by first and second sides and a base, and
   wherein the key portion of the ratchet includes a first end having first inclined surfaces and a second end, where in the drive condition the first inclined surfaces engage the first side and the base of the channel, and the second end engages the engaging groove of the drive gear.

8. The transmission of claim 7, wherein the second end of the ratchet includes a curved surface allowing the second end to slide along the second side of the channel as the wheeled machine transitions from the drive condition to the freewheeling condition.

9. The transmission of claim 7, wherein the second end includes a second inclined surface, where in the freewheeling condition the second inclined surface engages the inner peripheral surface of the drive gear.

10. The transmission of claim 1, wherein the relief of the holder is defined by a forward surface and a rear surface relative to the first rotational direction of the output shaft, where in the drive condition the leg portion of the ratchet contacts the forward surface and is spaced from the rear surface.

11. The transmission of claim 10, wherein a forward surface of the leg portion of the ratchet includes a first section and a second section canted relative to the first section, where in the drive condition the first section is in contact with the forward surface, as the wheeled machine transitions from the drive condition to the freewheeling condition the leg portion pivots on the forward surface, and where in the freewheeling condition the second section is in contact with the forward surface.

12. The transmission of claim 1, wherein the inner peripheral surface of the drive gear is polygonal shaped.

13. A manually operated wheeled machine having a drive condition and a freewheeling condition, the wheeled machine comprising:
   a motor;
   an output shaft operably coupled to the motor, the output shaft has a close-ended channel formed in an end portion thereof, the channel extends in an axially longitudinal direction of the output shaft and is axially spaced from an end face of the output shaft;
   a drive wheel connected to the end portion of the output shaft, the drive wheel including an inside wheel cover having an opening for the output shaft; and
   a transmission housed within the drive wheel, wherein the transmission includes:
      a drive gear rotatably mounted on the end portion of the output shaft, the drive gear includes an engaging groove formed in an inner peripheral surface of the drive gear, a ratchet having a key portion and a leg portion, the key portion is received in the channel, the ratchet is in selective engagement with the engaging groove, a holder rotatably mounted on the end portion of the output shaft immediately adjacent the drive gear, the holder includes an end face having a relief formed therein which receives the leg portion of the ratchet, a driven gear carried within the drive wheel and meshingly engaged with the drive gear, wherein to prevent dust intrusion into the channel the drive gear and the holder are arranged on the end portion of the output shaft to cover the channel, and the inside wheel cover includes a shroud covering each of the drive gear and the holder.

14. The wheeled machine of claim 13, wherein a friction member is secured to the holder and adapted to apply radial friction to the holder to temporarily prevent rotation of the holder with the output shaft in the drive condition of the wheeled machine.

15. The wheeled machine of claim 14, where in the drive condition the key portion of the ratchet engages the engaging groove of the drive gear, and the output shaft rotates in a first rotational direction together with the drive gear and the holder, and where in the freewheeling condition the output shaft is stationary, an overdrive of the drive gear in the first rotational direction results in disengagement of the key portion of the ratchet with the engaging groove allowing for free rotation of the drive gear about the stationary output shaft.

16. The wheeled machine of claim 14, wherein the friction member is at least partially wrapped about an outer peripheral surface of the holder, and a free end portion of the friction member is secured to the inside wheel cover of the drive wheel.

17. The wheeled machine of claim 13, wherein the channel is rectangular in cross-section taken perpendicular to the axially longitudinal direction of the output shaft.

18. A transmission for a manually operated wheeled machine having a drive condition and a freewheeling condition, the transmission comprising:

an output shaft having a close-ended channel formed in an end portion thereof, the channel extends in an axially longitudinal direction of the output shaft and is axially spaced from an end face of the output shaft;

a drive gear rotatably mounted on the end portion of the output shaft, the drive gear includes an engaging groove formed in an inner peripheral surface of the drive gear;

a ratchet received in the channel and in selective engagement with the engaging groove;

a holder rotatably mounted on the end portion of the output shaft, the holder includes an end face confronting the drive gear, a relief formed in the end face receives the ratchet;

a friction member at least partially wrapped about an outer peripheral surface of the holder and adapted to apply radial friction to the holder to temporarily prevent rotation of the holder with the output shaft in the drive condition of the wheeled machine; and a driven gear meshingly engaged with the drive gear and carried within a drive wheel of the wheeled machine.

19. The transmission of claim 18, wherein the friction member is a spring member, and a free end portion of the spring member is secured to an inside wheel cover of the drive wheel.

20. The transmission of claim 18, wherein to prevent dust intrusion into the channel the drive gear and the holder are arranged on the end portion of the output shaft to cover the channel, and an inside wheel cover of the drive wheel includes a shroud covering each of the drive gear and the holder.

* * * * *